Oct. 12, 1943.  O. C. MARTIN  2,331,562
VALVE CONSTRUCTION
Original Filed June 4, 1940
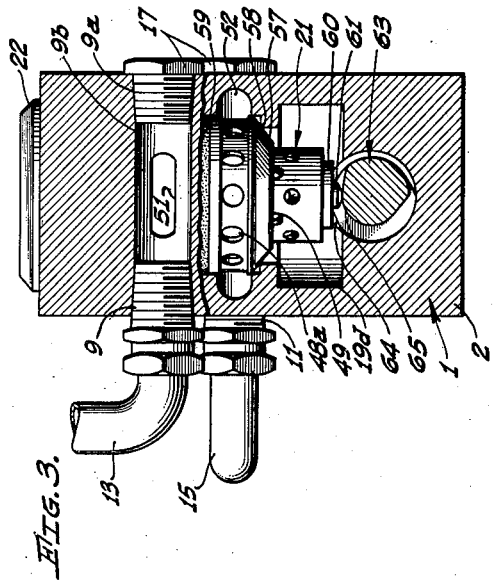
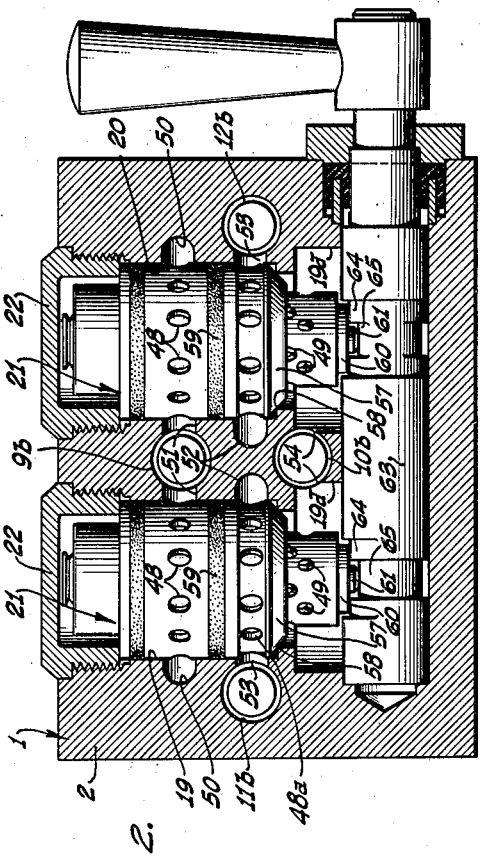
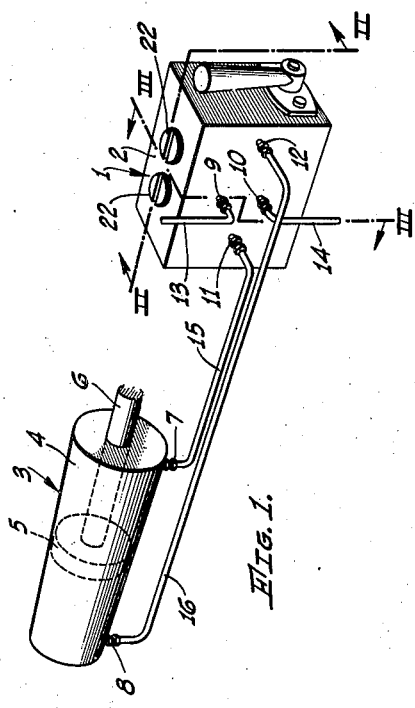
OTIS C. MARTIN,
INVENTOR
BY
*Harold W. Mattingly*
ATTORNEY Patented Oct. 12, 1943

2,331,562

UNITED STATES PATENT OFFICE 2,331,562

VALVE CONSTRUCTION

Otis C. Martin, Los Angeles, Calif.

Original application June 4, 1940, Serial No. 338,727, now Patent No. 2,282,490, dated May 12, 1942. Divided and this application April 1, 1942, Serial No. 437,125

3 Claims. (Cl. 251—155)

My invention relates to valves and has particular reference to a body construction for control valves for hydraulic power systems.

This application is a division of my copending application Serial No. 338,727, filed June 4, 1940, now Patent No. 2,282,490, granted May 12, 1942, and entitled "Valve construction."

The modern aeroplanes and particularly the military aircraft employ a number of hydraulic power systems for effecting certain of the mechanical functions of the mechanism. For example, it is the common practice to use such hydraulic power system to effect the raising and lowering of retractable landing gears and bomb racks and to effect the opening and closing of bomb hatches and the like. These systems are controlled by means of 3-way or 4-way valves mounted in the pilot's, engineer's or bombardier's compartments.

Because of the variety of structures upon which such valves are mounted and because of the extremely limited space available in which such valves may be positioned, considerable difficulty has in the past been experienced in producing a valve body having the fluid line connections so arranged as to permit the ready installation of the valve in all of the various desired locations. In general, if the fluid connections are provided on top, for example, to fit one installation, the next will require that the connections be on the bottom; or if one require the connections to be on the left side, the next will require connections to the right-hand side, etc.

Prior to my invention it was the practice to use one type of valve and fit the tubing lines to that valve as by means of return bends or by means of U-bends formed in the tubing itself. This practice not only increased the weight of the installation and the space occupied thereby over what it would be were such bends omitted, but also resulted in such an intermingling and overlapping of the tubing lines as to make the original installation a laborious and time consuming task and render maintenance operations exceedingly difficult.

It is, therefore, an object of my invention to provide a valve body construction which will overcome the above noted disadvantages by providing for the attachment of the fluid lines at either side of the body as desired.

It is also an object of my invention to provide a valve body construction in which each of the fluid supply ports is extended completely through the body from one side thereof to the other and provided at each end with means for connecting a fluid line thereto.

It is an additional object of my invention to provide a valve body construction of the character set forth in the preceding paragraph in which a closure means is employed to seal up the end of each of the supply ports to which fluid lines are not connected.

Other objects and advantages of my invention will be apparent from a study of the following specifications, read in connection with the accompanying drawing, wherein:

Fig. 1 is a perspective view of a valve constructed in accordance with my invention and illustrated diagrammatically as being connected to control a piston and cylinder type of fluid power apparatus;

Fig. 2 is a transverse vertical sectional view of the valve construction illustrated in Fig. 1, the view being taken along the line II—II of Fig. 1; and Fig. 3 is a longitudinal vertical sectional view taken along the line III—III of Fig. 1 to illustrate additional details of construction of the valve of my invention.

Referring to the drawing, I have illustrated in Fig. 1 a valve 1 constructed in accordance with my invention, such valve including a body member or block 2 which may be and is preferably constructed from a single block of suitable material, either metal or plastic material, though for the purpose of permitting my valve to control pressures of several hundreds of pounds and yet be extremely light in weight I prefer to form the body block 2 from a single piece of aluminum alloy such as "Duralumin."

The particular form of valve illustrated in Fig. 1 is one which is adapted to control reversible power apparatus such as a piston and cylinder mechanism 3, selected merely for the purposes of illustration as including a cylinder 4, within which reciprocates a piston 5 coupled to whatever device is to be operated thereby by means of a piston rod 6. At one end of the cylinder 4 is a fluid inlet 7 while at the opposite end there is a fluid inlet 8 so that by supplying fluid under pressure to the inlet 7 the piston 5 will move from the right-hand end of the cylinder 4, as viewed in Fig. 1, toward the left-hand end, exhaust fluid from the left-hand side of the piston 5 being passed out through the fluid inlet (outlet) 8. By supplying fluid pressure through the fluid inlet 8 and exhaust fluid through the inlet (outlet) 7, the piston 5 will be moved in the opposite direction. This form of valve illustrated in Fig. 1 has been selected for the purpose of presenting the most comprehensive view of my improved valve construction but, as will be pointed out hereinafter, the principles of the invention are equally adapted to either single or multiple valves to be used for various other types of installations.

With the form of valve illustrated in Fig. 1, the valve body block 2 is provided with a plurality of ports 9, 10, 11 and 12, respectively, to which may be connected the various pipe lines required for the operation of the system; for example, the port 9 may be coupled to a supply line 13 leading from a suitable tank or other source of fluid under pressure while the port 10 may be coupled by a suitable pipe 14 as a return line to the tank or as an exhaust line exhausting to the atmosphere. The port 11 may be connected by a suitable pipe 15 to the inlet 7 for the cylinder 4 while the port 12 may be connected with the fluid inlet 8 of the cylinder 4 by means of a pipe 16.

Referring particularly to Fig. 3, it will be observed that my valve is readily adaptable for mounting in a number of different positions which will readily permit the connection of the various pipe lines to either one side or the other side of the valve body block 2 by forming the ports 9, 10, 11 and 12 on one side of the body block 2 and by forming corresponding ports on the opposite side of the body block, one pair of such ports being illustrated in Fig. 2 as including the supply port 9 to which the pipe line 13 is connected while a similar and corresponding port 9a is formed in the opposite side of the body block 2 with a laterally extending fluid passage 9b interconnecting the ports and 9a. Thus the pipe line 13 may be connected to the left-hand side of the valve body if that is the most convenient side to obtain access to and the port 9a may be plugged with a suitable threaded plug 17. If, on the other hand, the right-hand side of the valve body 2 is easiest of access, then the pipe 13 may be coupled by means of any suitable coupling 18 to the port 9a and the plug 17 may be used to fill the port 9.

It will be understood that laterally extending bores or fluid passages 10b, 11b and 12b (see Fig. 2) extend laterally through the valve body 2 so as to permit access for the pipes 14, 15 and 16 to either side of the valve body in the same manner as was described for the port 9 and pipe 13.

When my valve is to be employed with a power apparatus such as 3, I prefer to provide in the valve block 2 a pair of valve chamber bores 19 and 20, respectively, such valve bores extending in parallel relation to each other and disposed side by side in the same vertical plane. The valve bore 19 preferably extends from the top surface of the valve body 2 and is disposed between the fluid passage 11b on the one hand and the fluid passages 9b and 10b on the other hand, while the valve bore 20 similarly extends from the top surface of the valve body 2 and is disposed between the fluid passage 12b on the one hand and the fluid passages 9b and 10b on the other hand. Thus the fluid passages 9b and 10b are common to both of the valve bores.

Within each of the valve chamber bores 19 and 20 I position control valve units 21 which are preferably removably secured in said bores as by means of cap or plug members 22 threaded into the open upper ends of the bores 19 and 20 and engaging the units 21.

The units 21 are each preferably constructed as described and claimed in my parent application Serial No. 338,727, filed June 4, 1940 and entitled "Valve construction." For the purpose of the present description it is sufficient to note that each of the units 21 comprises a self-contained cartridge within which is mounted a pair of valves, the upper one of which is adapted to open and close a fluid passage between an upper set of apertures 48 and a central set of apertures 48a extended through the wall of the cartridge, and the lower one of which is adapted to open and close a fluid passage between the central set of apertures 48a and a lower set of apertures 49 also extended through the wall of the cartridge. The sets of apertures 48, 48a and 49 are suitably isolated from each other by means of a seat construction 57—58 and a sealing ring or gasket 59.

Operating stems 60 and 61 for the valves in the cartridge are extended exteriorly of the cartridge and into engagement with an operating shaft or cam shaft 63 extending transversely of the bores 19 and 20 and providing cam surfaces 64 and 65 arranged to selectively open and close the valves in the valve unit 21 upon rotation of the cam shaft and in the manner disclosed in my parent application above mentioned.

To permit the valve units 21 to control the flow of fluid in the fluid lines 13, 14, 15 and 16 it is necessary that both of the upper sets of apertures 48 in the valve units 21 communicate with the fluid passage 9b and that both of the lower sets of apertures 49 in the valve units 21 communicate with the fluid passage 10b. It is also necessary that the central set of apertures 48a in one of the valve units 21 communicate with the fluid passage 11b while the central set of apertures 48a in the other valve unit 21 communicates with the fluid passage 12b.

This is readily accomplished by employing the principles of construction and manufacture described in my copending applications Serial No. 323,376, filed March 11, 1940, and Serial No. 330,752, filed April 20, 1940, as by forming the bore 19, forming the bores for the fluid passages 9b, 10b, 11b and 12b, and then inserting through the bore 19 a suitable boring tool which will enlarge the bore 19 as indicated at 50 to form an annular chamber surrounding the valve unit 21, the diameter of the enlargement 50 being sufficient to intersect the fluid passage bore 9b at 51 and thus provide for intercommunication between the fluid passage 9b and the interior of both of the valve assemblies 21.

Similarly, the bore 19 may be enlarged as indicated at 52 immediately adjacent the location of the fluid openings 48a, such enlargement 52 intersecting the fluid passage 11b as indicated at 53. Similarly, the lowermost portion of the bore 19 is enlarged as at 19d to intersect the fluid passage 10b as indicated at 54.

From the foregoing it will be observed that I have provided a novel valve body construction which is adapted for single, 3-way or multiple valve operation and which permits each of the fluid connections to such a valve to be made at any one of a plurality of points as desired to thereby permit the valve to be installed as desired and substantially without regard to the locations of the fluid lines to be connected thereto.

While I have shown and described the preferred embodiment of my invention, I do not desire to be limited to any of the details of construction shown or described herein, except as defined in the appended claims.

I claim:

1. In a fluid control valve, a body member having opposed faces, a pair of parallelly disposed fluid inlet passages extending through said body member from one of said faces to the other, means in said fluid passages for connecting fluid pipes from either face of said body, plugs for closing the end of each of said passages to which pipes are not connected, and a valve receiving bore in said body extending transversely of said passages and spaced therefrom, said bore having enlargements intersecting each of said passages.

2. In a fluid control valve, a body member having opposed faces, a pair of parallelly disposed fluid inlet passages extending through said body member from one of said faces to the other, means in said fluid passages for connecting fluid pipes from either face of said body, plugs for closing the end of each of said passages to which pipes are not connected, and a valve receiving bore in said body extending transversely of said passages and spaced therefrom, said bore having spaced enlargements each intersecting one of said passages.

3. In a fluid control valve, a body member having opposed faces, a pair of parallelly disposed fluid inlet passages extending through said body member from one of said faces to the other, means in said fluid passages for connecting fluid pipes from either face of said body, plugs for closing the end of each of said passages to which pipes are not connected, and a valve receiving bore in said body extending transversely of said passages and positioned between said passages but spaced therefrom, said bore having an enlargement intersecting both of said passages.

OTIS C. MARTIN.